United States Patent
Yoshida et al.

[19]

[11] Patent Number: 6,075,862
[45] Date of Patent: Jun. 13, 2000

[54] DECRYPTION KEY MANAGEMENT SCHEME FOR SOFTWARE DISTRIBUTION SYSTEM

[75] Inventors: Hideki Yoshida, Kanagawa-ken; Hideo Segawa, Tokyo; Toru Imai, Kanagawa-ken, all of Japan

[73] Assignee: Kabushiki Kaisha Toshiba, Kawasaki, Japan

[21] Appl. No.: 08/689,118

[22] Filed: Jul. 30, 1996

[30] Foreign Application Priority Data

Jul. 31, 1995 [JP] Japan .................. P07-194695

[51] Int. Cl.[7] ............................................. H04L 9/00
[52] U.S. Cl. ................... 380/28; 380/25; 380/4
[58] Field of Search ..................... 380/4, 21, 23, 380/25, 28, 30

[56] References Cited

U.S. PATENT DOCUMENTS

| | | | |
|---|---|---|---|
| 4,817,140 | 3/1989 | Chandra et al. | 380/4 |
| 4,847,902 | 7/1989 | Hampson | 380/4 |
| 4,888,798 | 12/1989 | Earnest | 380/4 |
| 5,010,571 | 4/1991 | Katznelson | 380/4 |
| 5,058,162 | 10/1991 | Santon et al. | 380/25 |
| 5,103,392 | 4/1992 | Mori | 395/725 |
| 5,199,066 | 3/1993 | Logan | 380/4 |
| 5,319,705 | 6/1994 | Halter et al. | 380/4 |
| 5,457,746 | 10/1995 | Dolphin | 380/4 |
| 5,555,304 | 9/1996 | Hasebe et al. | 380/4 |
| 5,586,186 | 12/1996 | Yuval et al. | 380/4 |
| 5,598,470 | 1/1997 | Cooper et al. | 380/4 |
| 5,677,953 | 10/1997 | Dolphin | 380/4 |
| 5,703,951 | 12/1997 | Dolphin | 380/4 |
| 5,745,568 | 4/1998 | O'Connor et al. | 380/4 |
| 5,757,908 | 5/1998 | Cooper et al. | 380/4 |
| 5,784,460 | 7/1998 | Blumenthal et al. | 380/4 |

FOREIGN PATENT DOCUMENTS 7-93148  4/1995  Japan .

OTHER PUBLICATIONS

Mori et al., "Superdistribution: The Concept and the Architecture", The Transactions of the IEICE, vol. E73, No. 7, pp. 1133–1146, Jul. 1990.

*Primary Examiner*—Max Noori
*Attorney, Agent, or Firm*—Foley & Lardner

[57] ABSTRACT

A decryption key management scheme for a software distribution system utilizing the decryption key, which can enable the re-install of the software that was decrypted once by a proper procedure, without requiring a re-acquisition of the decryption key from the software vender, so that a user can freely delete and re-install the software that was properly obtained once. The decryption key is searched in a memory device of a user's computer, or acquired from a distribution source of the encrypted software when the decryption key is not found in the memory means. Then, the encrypted software is decrypted by using the obtained decryption key, and a decrypted software content is installed into the memory device, while the decryption key acquired from the distribution source is stored into the memory device, such that the decryption key stored in the memory device is utilizable in decrypting the encrypted software at a time of re-installing the encrypted software.

34 Claims, 8 Drawing Sheets

DECRYPTION KEY REQUEST MESSAGE 20

| HEADER | MACHINE ID | SOFTWARE ID | USER NAME | CREDIT NUMBER |
| 21 | 22 | 23 | 24 | 25 |

DECRYPTION KEY MANAGEMENT SCHEME FOR SOFTWARE DISTRIBUTION SYSTEM

BACKGROUND OF THE INVENTION

1. Field of the Invention

The present invention relates to a decryption key management scheme for managing a decryption key for decrypting an encrypted software in a software distribution system.

2. Description of the Background Art

Conventionally, a software to be used by a computer is individually stored in a recording medium such as floppy disks and usually sold at a retail store in a form of a software package which contains the recording medium along with a manual and other necessary items.

In a case of such a software package, the licensing to give a permission to use the software is usually made in a form which is inseparable from the sale of the software package. For instance, there are cases in which a document describing that a contract to use the software is established as soon as the software package is opened is distributed along with the software package itself, or cases in which a user is required to sign a contract to use the software with the software vender by using a user registration form enclosed in the software package.

In contrast, recently, there are propositions for a new software distribution scheme aimed at realization of a freer distribution style and a tighter software right owner protection. As a representative example of such a new software distribution scheme, the so called superdistribution scheme is well known (see: R. Mori and M. Kawahara, "Superdistribution: The Concept and the Architecture", The Transactions of the IEICE, Vol. E73, No. 7, pp. 1133–1146, July 1990; and U.S. Pat. No. 5,103,392).

The superdistribution scheme utilizes a software structure formed by an encrypted software content and a header portion having a function to decrypt the encrypted software content. In addition, two concepts called "S-credit" and "Software Usage Monitor" are utilized to realize the licensing between a user and a software right owner and the management of software usage charges.

"S-credit" is realized in a form of a memory card such as an IC card which stores information as to quantitatively how much software usage is to be permitted to a user. A user who wishes to use the software distributed by the superdistribution first pays an appropriate fee at a service center of the superdistribution system, and receives the "S-credit" which registers the information corresponding to the paid fee.

"Software Usage Monitor" is a program which recognizes a balance of the user's contract from a value of the information registered in the "S-credit", and permits or prohibits the execution of the software according to the recognized balance of the user's contract. This program permits the execution of the software after confirming the availability of the "S-credit" indicating a balance greater than a certain value on the computer, and decreases the value of the information registered in the "S-credit" (indicating the balance) as much as a fee to be charged for this software.

However, in such a method for managing the software usage charges using "S-credit", there is a need to provide a protection against illegal copying of "S-credit" or illegal rewriting of data of "S-credit", and to this end, it has been necessary to use a specialized hardware mechanism for limiting read/write with respect to "S-credit", for example.

For this reason, recently, there is a proposition for a new software distribution system in which the encrypted software content is distributed to users for free or for a very small charge, and a key for decrypting the encrypted software content is issued to a user who wishes to use this software in exchange for the payment of the software usage charge.

In this software distribution system, the software vender can save costs required for production and distribution of individual software packages, and in addition, an effective means for advertising the software can be provided by packaging a non-encrypted demonstration version of this software for demonstrating the encrypted software content in a medium such as CD-ROM which stores the encrypted software content. From a viewpoint of a user, this feature can provide an advantage in that there is a chance to try and see if the software is worth purchasing before actually purchasing the software.

The user receives the decryption key in exchange for the payment of the software usage charge for a desired software, and installs this software into a hard disk device of his own computer by decrypting the encrypted software content using the received decryption key.

In this manner, the software distribution system utilizing the decryption key can manage the software usage charge in a form of the exchange of the decryption key, so that there is no need for "S-credit" and a specialized hardware for managing "S-credit" required by the superdistribution scheme, and therefore it is possible to realize a freer software distribution style.

Now, considering a usual manner by which a user uses a computer, it often becomes necessary to delete the already installed software once in order to increase a usable capacity of the hard disk device, and then re-install the same software back to the hard disk device later on when a need to use this software arises. In a case of using the usual non-encrypted, packaged software, the user still possesses the recording medium contained in the software package itself, so that the deletion of the installed software on the hard disk device causes no problem, because it is possible to re-install the software from the recording medium when this software becomes necessary later on.

In contrast, in a case of the above described software distribution system utilizing the decryption key, the decrypted software which was installed on the hard disk device by using the decryption key is the only executable software available for a user. Consequently, when the user loses the decryption key which was acquired from the software vender in exchange for the software usage charge and wishes to re-install the same software, it is necessary to acquire the decryption key by paying the software usage charge for the same software again. This fact can lead to a lower reliability of the software distribution system utilizing the decryption key, which in turn can present a hindrance to a spread of this software distribution system utilizing the decryption key.

SUMMARY OF THE INVENTION

It is therefore an object of the present invention to provide a decryption key management scheme for a software distribution system utilizing the decryption key, which can enable the re-install of the software that was decrypted once by a proper procedure, without requiring a re-acquisition of the decryption key from the software vender, so that a user can freely delete and re-install the software that was properly obtained once.

According to one aspect of the present invention there is provided a method for managing a decryption key for decrypting an encrypted software to be installed into a computer, comprising the steps of: searching the decryption key in a memory device of said computer; acquiring the decryption key from a distribution source of the encrypted software when the decryption key is not found in the memory means by the searching step; decrypting the encrypted software by using the decryption key obtained at the searching step or the acquiring step, and installing a decrypted software content into the memory device; and storing the decryption key acquired by the acquiring step into the memory device, such that the decryption key stored in the memory device is utilizable in decrypting the encrypted software at a time of re-installing the encrypted software.

According to another aspect of the present invention there is provided a computer for managing a decryption key for decrypting an encrypted software to be installed into said computer, comprising: a memory device for storing a software content of each currently installed software, and a decryption key for decrypting each previously installed software; decryption key retrieval means for retrieving the decryption key for decrypting the encrypted software from the memory device; decryption key acquisition means for acquiring the decryption key corresponding to the encrypted software from a distribution source of the encrypted software when the decryption key is not found in the memory means by the decryption key retrieval means; decryption and install means for decrypting the encrypted software by using the decryption key obtained by the decryption key retrieval means or the decryption key acquisition means, and installing a decrypted software content into the memory device; and decryption key storing means for storing the decryption key acquired by the decryption key acquisition means into the memory device, such that the decryption key stored in the memory device is utilizable in decrypting the encrypted software at a time of re-installing the encrypted software.

According to another aspect of the present invention there is provided an article of manufacture, comprising: a computer usable medium having computer readable program code means embodied therein for causing a computer to function as a system for managing a decryption key for decrypting an encrypted software to be installed into said computer, the computer readable program code means including: first computer readable program code means for causing said computer to search the decryption key in a memory device of said computer; second computer readable program code means for causing said computer to acquire the decryption key from a distribution source of the encrypted software when the decryption key is not found in the memory means by the first computer readable program code means; third computer readable program code means for causing said computer to decrypt the encrypted software by using the decryption key obtained by the first computer readable program code means or the second computer readable program code means, and install a decrypted software content into the memory device; and fourth computer readable program code means for causing said computer to store the decryption key acquired by the second computer readable program code means into the memory device, such that the decryption key stored in the memory device is utilizable in decrypting the encrypted software at a time of re-installing the encrypted software.

According to another aspect of the present invention there is provided a method for distributing a software from a distribution source to users, comprising the steps of: encrypting a software to be distributed to users at a distribution source side, and distributing an encrypted software to users; searching a decryption key for decrypting the encrypted software in a memory device of a user's computer at an individual user side; providing the decryption key corresponding to the encrypted software from the distribution source side to the individual user side when the decryption key is not found in the memory means by the searching step; decrypting the encrypted software distributed at the encrypting step by using the decryption key obtained at the searching step or the providing step, and installing the decrypted software content into the memory device at the individual user side; and storing the decryption key acquired by the acquiring step into the memory device at the individual user side, such that the decryption key stored in the memory device is utilizable in decrypting the encrypted software at a time of re-installing the encrypted software.

According to another aspect of the present invention there is provided a system for distributing a software from a distribution source to users, comprising: a distribution source computer center for encrypting a software to be distributed to users, and distributing an encrypted software to users; and a plurality of user's computers connected with the distribution source computer center via a communication network, each user's computer having: a memory device for storing a software content of each currently installed software, and a decryption key for decrypting each previously installed software; decryption key retrieval means for retrieving the decryption key for decrypting the encrypted software from the memory device; decryption key acquisition means for acquiring the decryption key corresponding to the encrypted software from the distribution source computer center when the decryption key is not found in the memory means by the decryption key retrieval means; decryption and install means for decrypting the encrypted software distributed by the distribution source computer center by using the decryption key obtained by the decryption key retrieval means or the decryption key acquisition means, and installing a decrypted software content into the memory device; and decryption key storing means for storing the decryption key acquired by the decryption key acquisition means into the memory device, such that the decryption key stored in the memory device is utilizable in decrypting the encrypted software at a time of re-installing the encrypted software.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 9, one embodiment of a decryption key management scheme for a software distribution system according to the present invention will be described in detail.

Figure 1:
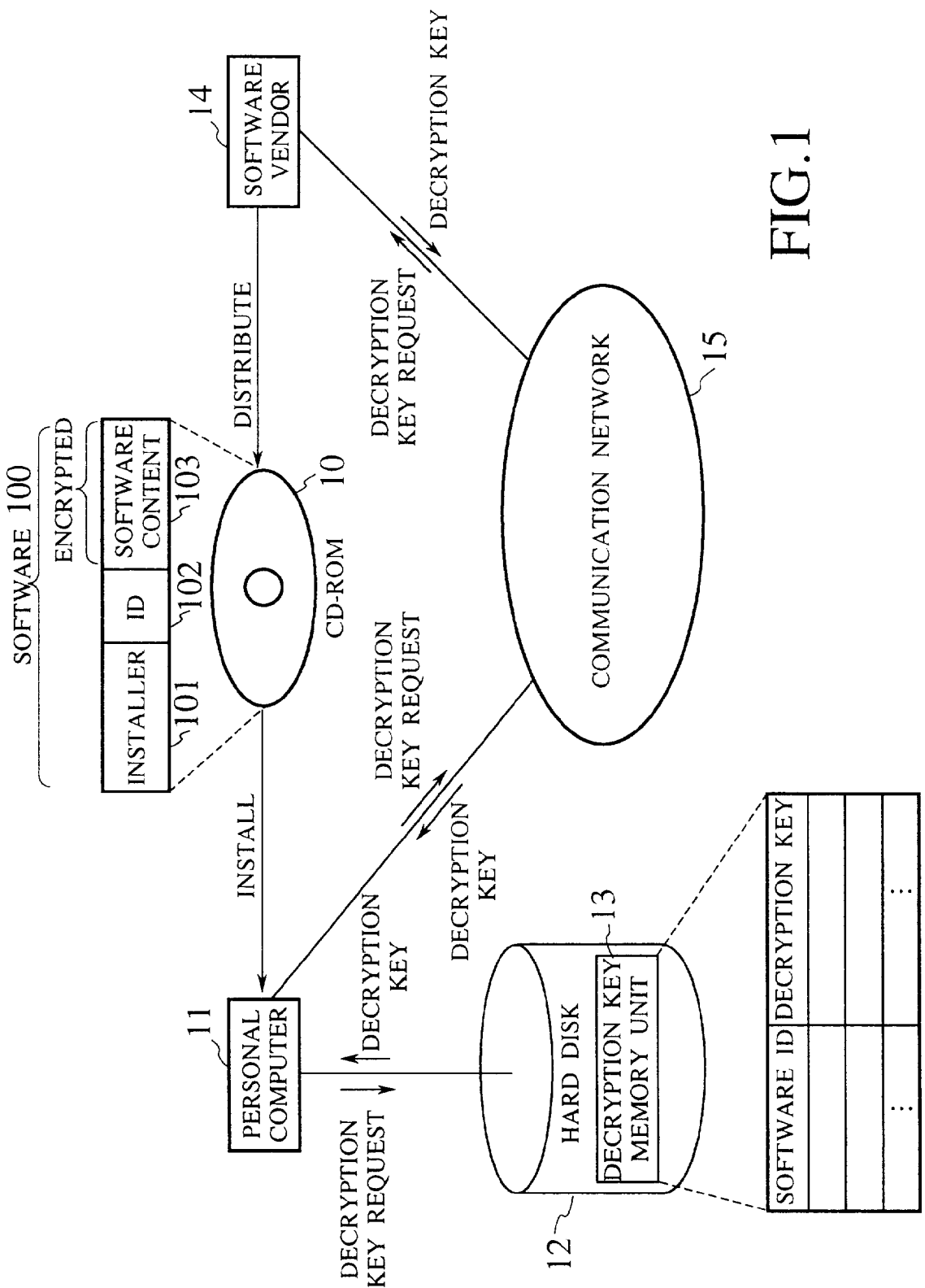
FIG. 1 is a block diagram of one embodiment of a software distribution system according to the present invention.

FIG. 1 shows an overall configuration of a software distribution system in this embodiment, which realizes a software distribution scheme in which the encrypted software content is distributed to users for free or for a very small charge, and a decryption key for decrypting the encrypted software content is issued to a user who wishes to use this software in exchange for the payment of the software usage charge for this software. This software distribution system of FIG. 1 generally comprises a plurality of subscribing user terminals, a software vender, and a communication network connecting each user terminal and the software vender. Note here that the encrypted software content implies encrypted information such as encrypted program and/or encrypted data.

In FIG. 1, one personal computer 11 is shown as a representative of the subscribing user terminals, where this personal computer 11 is connected with a computer center provided at the software vender 14 side, through the communication network 15 such as a telephone network or an ISDN.

The software vender 14 distributes a plurality of encrypted softwares 100 to users for free or for very small changes, where each encrypted software 100 can be provided in a form of a large capacity memory medium such as CD-ROM 10 in which the encrypted software content is contained, possibly along with a demonstration version of this software for demonstrating the encrypted software content, or in a form of data transferred through the communication network 15.

The software vender 14 also maintains and manages the decryption key for decrypting each encrypted software 100 distributed to users.

As shown in FIG. 1, each software 100 recorded in the CD-ROM 10 includes an installer 101, a software ID 102, and a software content 103. Here, the software content 103 is encrypted, but the installer 101 and the software ID 102 are not. When the demonstration version of the software is to be included, this demonstration version is also not encrypted.

The installer 101 is a program for decrypting the encrypted software content 103 and installing the decrypted software content into the personal computer 11 of the user.

The software ID 102 is a unique ID for identifying each encrypted software 100.

The software content 103 is information such as an application program or a utility program which can be operated under a prescribed operating system, or various types of data files such as those of image data.

The personal computer 11 has a hard disk device 12 which is used as a secondary memory device. On this hard disk device 12, the operating system and various application programs to be executed on the personal computer 11, and/or various data files are installed. In addition, in a memory region of this hard disk device 12, a decryption key memory unit 13 is provided.

The decryption key memory unit 13 is a kind of independent data file which can be referred by the installer 101. This decryption key memory unit 13 stores the software ID of each encrypted software 100 which was installed once, in correspondence to the decryption key for decrypting each encrypted software 100 that was acquired from the software vender 14. The decryption key stored in this decryption key memory unit 13 will be utilized in decrypting the encrypted software 100 to be re-installed.

The storing of the software ID and the decryption key into the decryption key memory unit 13 is made when the decryption key is acquired form the software vender 14. In practice, it suffices for the decryption key memory unit 13 to store only the decryption key which corresponds to the deleted software, so that the software ID and the decryption key corresponding to the software to be deleted can be stored into the decryption key memory unit 13 at a time of actually deleting this software.

Figure 2:
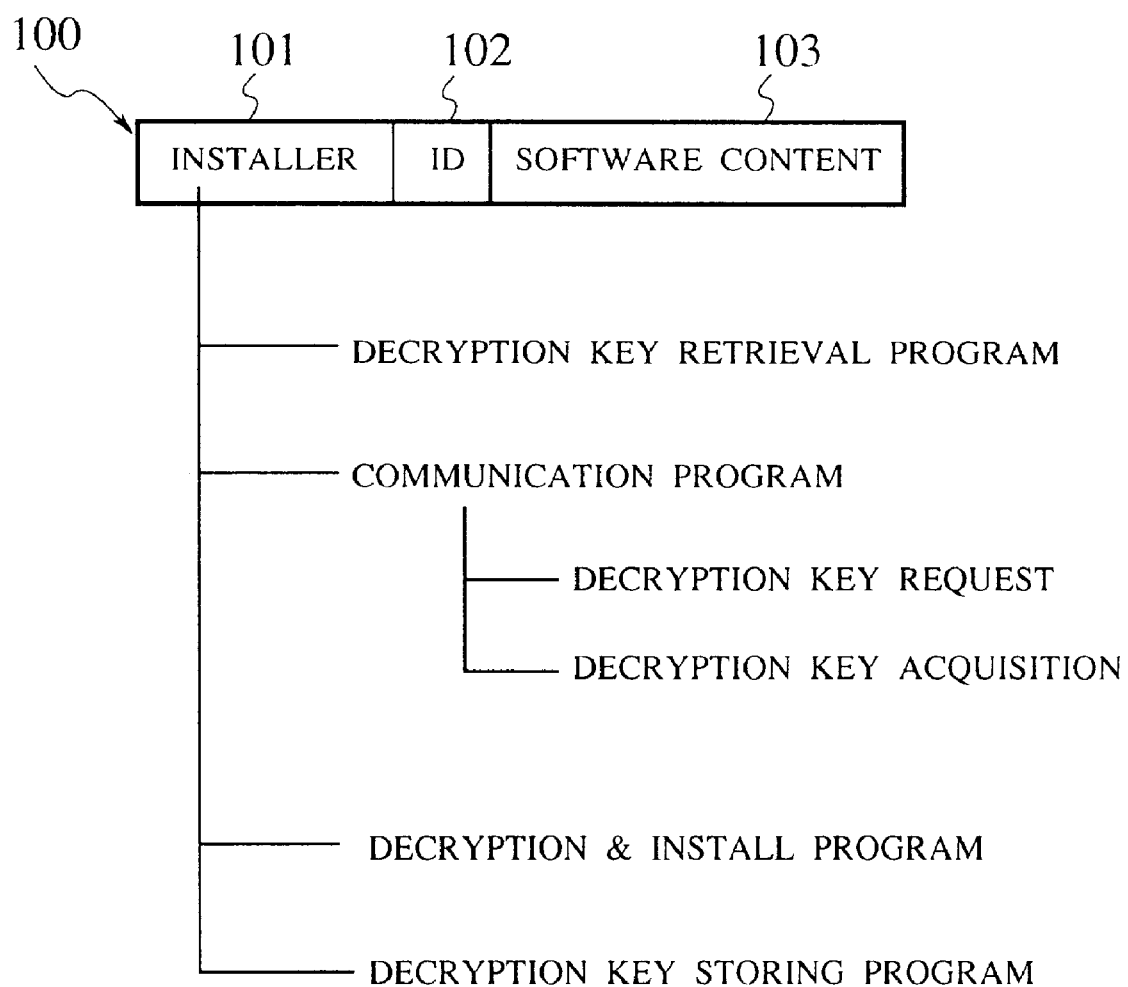
FIG. 2 is a diagram showing a program structure of an installer in an encrypted software used in the system of FIG. 1.

FIG. 2 shows a program structure of the installer 101, which includes a decryption key retrieval program, a communication program, a decryption and install program, and a decryption key storing program. In the following, the function realized by executing each of these programs will be described with reference to FIG. 3.

Figure 3:
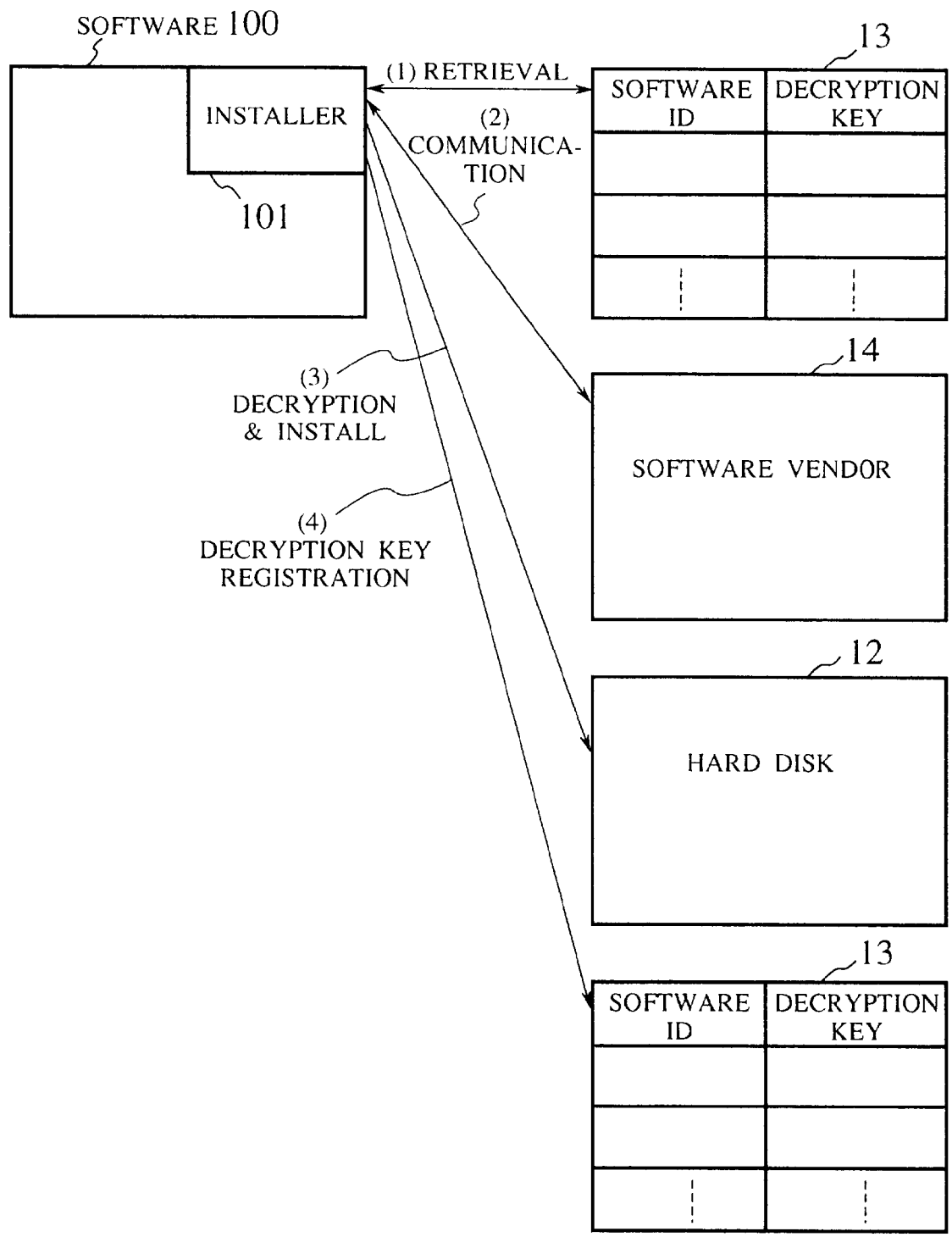
FIG. 3 is a diagram illustrating functions to be realized by programs included in the installer shown in FIG. 2.

The decryption key retrieval program searches through the decryption key memory unit 13, and retrieves the decryption key for decrypting the encrypted software content 103 (operation (1) of FIG. 3). As described above, the decryption key memory unit 13 registers the software IDs and the decryption keys corresponding to the encrypted softwares 100 that were already installed. Therefore, the decryption key retrieval by the decryption key retrieval program can be realized by a sequential search for sequentially comparing the software ID 102 of a desired software with each software ID registered in the decryption key memory unit 13, or by a binary search through the software IDs registered in the decryption key memory unit 13.

The communication program carries out a communication with the software vender 14 through the communication network 15 so as to acquire the decryption key from the software vender 14 in exchange for the payment of the software usage charge (operation (2) of FIG. 3). This communication program includes a routine for transmitting a decryption key request message to the software vender 14, and a routine for receiving the decryption key from the software vender 14. This communication program is to be executed when the decryption key retrieval by the decryption key retrieval program fails, that is, when the corresponding decryption key does not exist in the decryption key memory unit 13.

The decryption and install program decrypts the software content 103, by using the decryption key retrieved by the decryption key retrieval program in a case of a retrieval success, or the decryption key acquired from the software vender 14 by the communication program in a case of a retrieval failure, and installs the decrypted software content into the hard disk device 12 (operation (3) of FIG. 3). In a case of re-installing the software, the encrypted software content 103 to be decrypted and installed by this decryption and install program is to be acquired from the software vender 14 again, for free or for a very small charge.

The decryption key storing program registers the decryption key acquired from the software vender 14 by the communication program into the decryption key memory unit 13 in corresponding to the corresponding software ID (operation (4) of FIG. 3).

According to the installer 101 which has a program structure as described above, the decryption key acquired from the software vender 14 is used for decrypting the software content 103, and then stored in the decryption key memory unit 13 as a separate file from the decrypted software content 103. For this reason, even when the decrypted software content is deleted from the hard disk device 12, the decryption key stored in the decryption key memory unit 13 is maintained therein, without being deleted.

Consequently, in a case of re-installing the software which was already installed once, it is possible to decrypt the encrypted software content 103 to be re-installed immediately by utilizing the decryption key stored in the decryption key memory unit 13. As for the encrypted software 100 to be installed for the first time, the decryption key will be automatically acquired from the software vender 14 by the installer 101.

Figure 4:
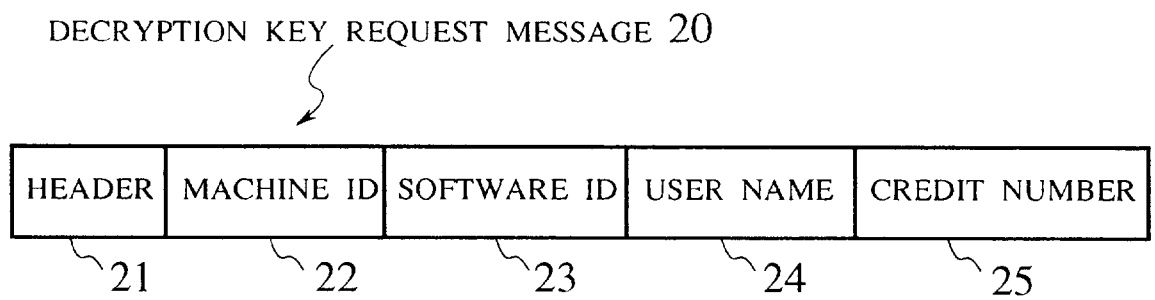
FIG. 4 is a diagram showing a data structure of a decryption key request message used in the system of FIG. 1.

In this embodiment, the decryption key request message to be transmitted to the software vender 14 by the communication program has a data structure as shown in FIG. 4, where the decryption key request message 20 includes a header portion 21 containing information necessary for communication, a machine ID 22 of the personal computer 11, a software ID 23 of an encrypted software 100 to be installed, a user name 24, and a user's credit number 25.

Figure 5:
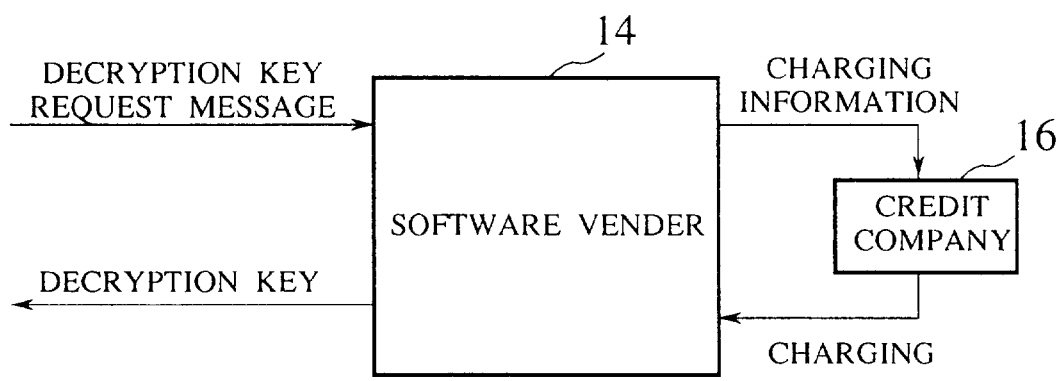
FIG. 5 is a diagram showing an operation of a software vender side in a case of receiving the decryption key request message of FIG. 4.

Now, the operation of the software vender 14 in a case of receiving this decryption key request message will be described with reference to FIG. 5.

Namely, the software vender 14 detects the software ID 23 from the received decryption key request message, and identifies a desired software of the user. Then, the software vender 14 generates a charging information necessary for the charging processing from the software usage charge for the identified software, the user name 24, and the user's credit number 25. Then, the charging processing according to this charging information is carried out by the software vender 14 itself, or by a credit company 16 to which the charging processing is entrusted.

Then, the software vender 14 transmits the decryption key corresponding to the software ID 23 to the user who issued the decryption key request message. In this case, it is also possible to adopt a scheme in which the decryption key is encrypted by using the machine ID 22 of the user before being transmitted to the user, and the installer 101 uses the decryption key after decrypting the encrypted decryption key by using the machine ID.

In this manner, the management of the software usage charge can be automatically realized by utilizing the request and the issuance of the decryption key.

Figure 6:
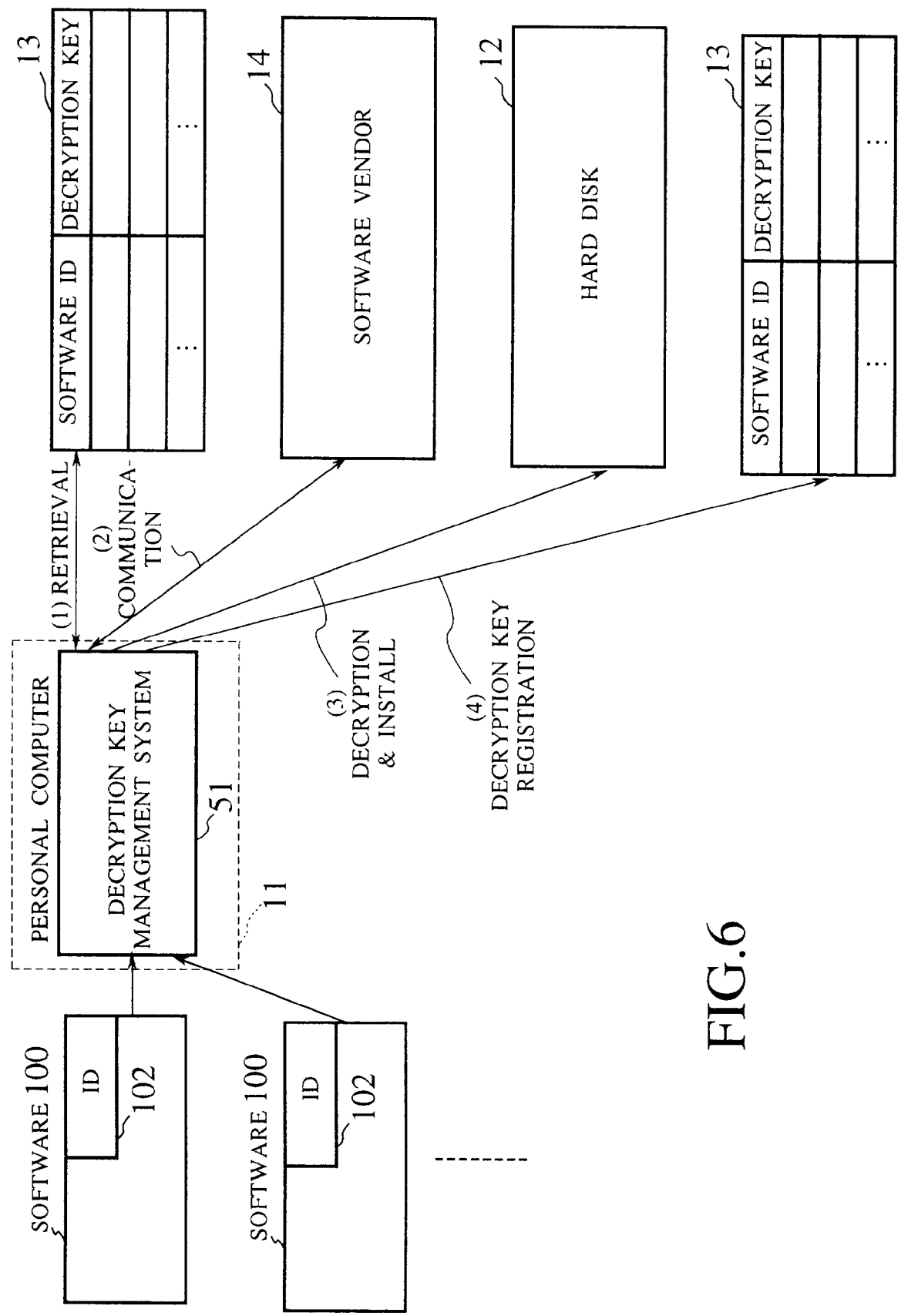
FIG. 6 is a diagram showing an alternative configuration using a common installer for all encrypted softwares.

FIG. 6 shows an alternative configuration in which the function of the installer 101 is implemented in the personal computer 11 and utilized as a common installer for installing all the encrypted softwares into the personal computer 11.

Namely, in FIG. 6, a decryption key management system 51 is implemented in the personal computer 11, and used to realize the function of the common installer with respect to all the encrypted softwares. This decryption key management system 51 can be realized as a program which is to be installed into the personal computer 11 of each user at a time of forming the software distribution system of this embodiment.

In this case, the decryption key management system 51 includes a group of programs similar to those included in the installer 101 of FIG. 2, that is, the decryption key retrieval program, the communication program, the decryption and install program, and the decryption key storing program.

In a case of utilizing this decryption key management system 51, it suffices for each encrypted software 100 to include the software content 103 and the software ID 102, and the installer 101 is unnecessary. In this case, the software ID of each encrypted software will be utilized in the decryption key retrieval from the decryption key memory unit 13 similarly as described above.

Now, with references to FIG. 7 to FIG. 9, the decryption key management processing to be realized in the software distribution system of FIG. 1 will be described in further detail.

Figure 7:
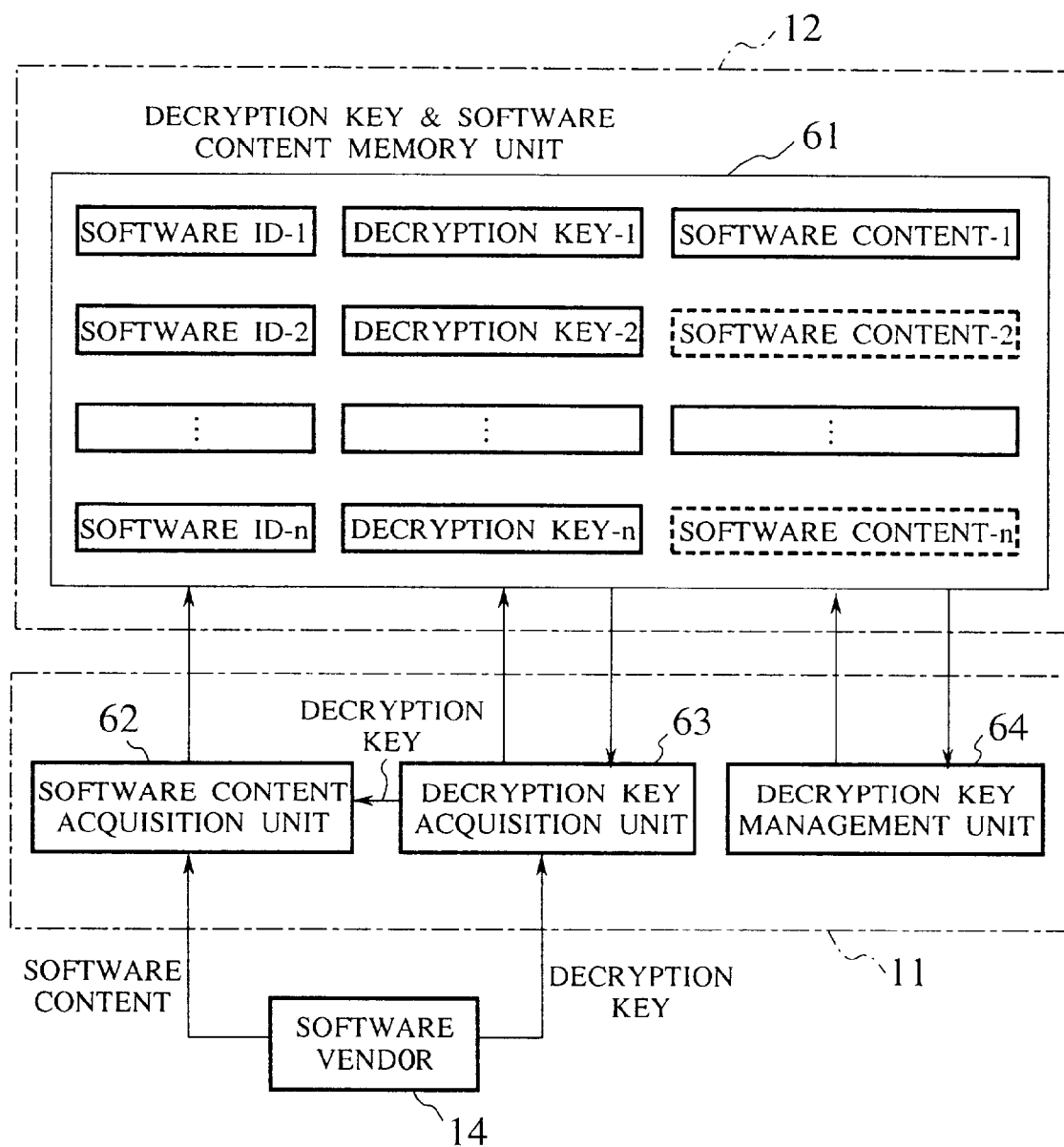
FIG. 7 is a block diagram of one exemplary detailed configuration of the system of FIG. 1 relevant to the decryption key management processing.

FIG. 7 shows one exemplary detailed configuration of the software distribution system of FIG. 1 relevant to the decryption key management processing in this embodiment.

In this configuration of FIG. 7, the hard disk device 12 includes a decryption key and software content memory unit 61 which plays the role of the decryption key memory unit 13 of FIG. 1 as well as the role of the rest of the hard disk device 12 of FIG. 1. In this decryption key and software content memory unit 61 of FIG. 7, the software content enclosed by a dashed line enclosure indicates a state in which this software content itself is already deleted and no longer stored, but the corresponding software ID and decryption key are still stored, whereas the software content enclosed by a solid line enclosure indicates a state in which this software content is currently stored along with the corresponding software ID and decryption key.

Also, in this configuration of FIG. 7, the personal computer 11 includes a software content acquisition unit 62, a decryption key acquisition unit 63, and a decryption key management unit 64, which are connected with the decryption key and software content memory unit 61, while the software content acquisition unit 62 and the decryption key acquisition unit 63 are also connected with each other as well as with the software vender 14.

In a case of installing the encrypted software acquired from the software vender 14, either by a communication through the communication network or by a purchase of the recording medium such as CD-ROM, into the personal computer 11 of the user by the software content acquisition unit 62, the decryption key acquisition unit 63 retrieves the decryption key for this software from the decryption key and software content memory unit 61 by using the software ID of this software as a retrieval key. This decryption key acquisition unit 63 corresponds to functions of the decryption key retrieval program, the communication program, and the decryption key storing program of the installer 101 or the decryption key management system 51 described above.

When the corresponding decryption key is found, the retrieved decryption key is used to decrypt the encrypted software, whereas when the corresponding decryption key is not found, the decryption key acquisition unit 63 acquires the corresponding decryption key from the software vender 14 through the communication network, and stores the acquired decryption key and the software ID in correspondence in the decryption key and software content memory unit 61. Then, the encrypted software content is decrypted by using the obtained decryption key and installed into the decryption key and software content memory unit 61 by the software content acquisition unit 62. This software content acquisition unit 62 corresponds to functions of the decryption and install program of the installer 101 or the decryption key management system 51 described above.

In a case of deleting a certain software, only the software content of this software is deleted by the decryption key management unit 64, while the corresponding software ID and decryption key are maintained in the decryption key and software content memory unit 61. This operation can be realized by storing a pair of corresponding software ID and decryption key separately from the corresponding software content within the decryption key and software content memory unit 61.

Also, the decryption key management unit 64 can be realized as a file management system in a sense that it deletes the software content. In this case, the decryption key management unit 64 is going to delete only the software content in response to a program file deletion command given from the user. Here, it is also possible for the decryption key management unit 64 to carry out a processing to read out the software ID and the decryption key corresponding to the software content to be deleted from the decryption key and software content memory unit 61 in response to the file deletion command, and write these software ID and decryption key back to the decryption key and software content memory unit 61 after the software content is deleted.

In this manner, the software ID and the decryption key are maintained in the decryption key and software content memory unit 61 even when the corresponding software content is deleted, by the operation of the decryption key management unit 64.

In a state of the decryption key and software content memory unit 61 shown in FIG. 7, the software-1 to the software-n have been installed, and out of these, the software contents of the software-2 and the software-n have been deleted, but the software ID and the decryption key are still maintained for all of the software-1 to the software-n including the software-2 and the software-n.

Note that when the decryption key memory unit and the software content memory unit is integrally combined as in FIG. 7, the operation to store the information becomes simpler, and there is an advantage in that there is no need for an external memory device other than the hard disk device 12 with the decryption key and software content memory unit 61.

Figure 8:
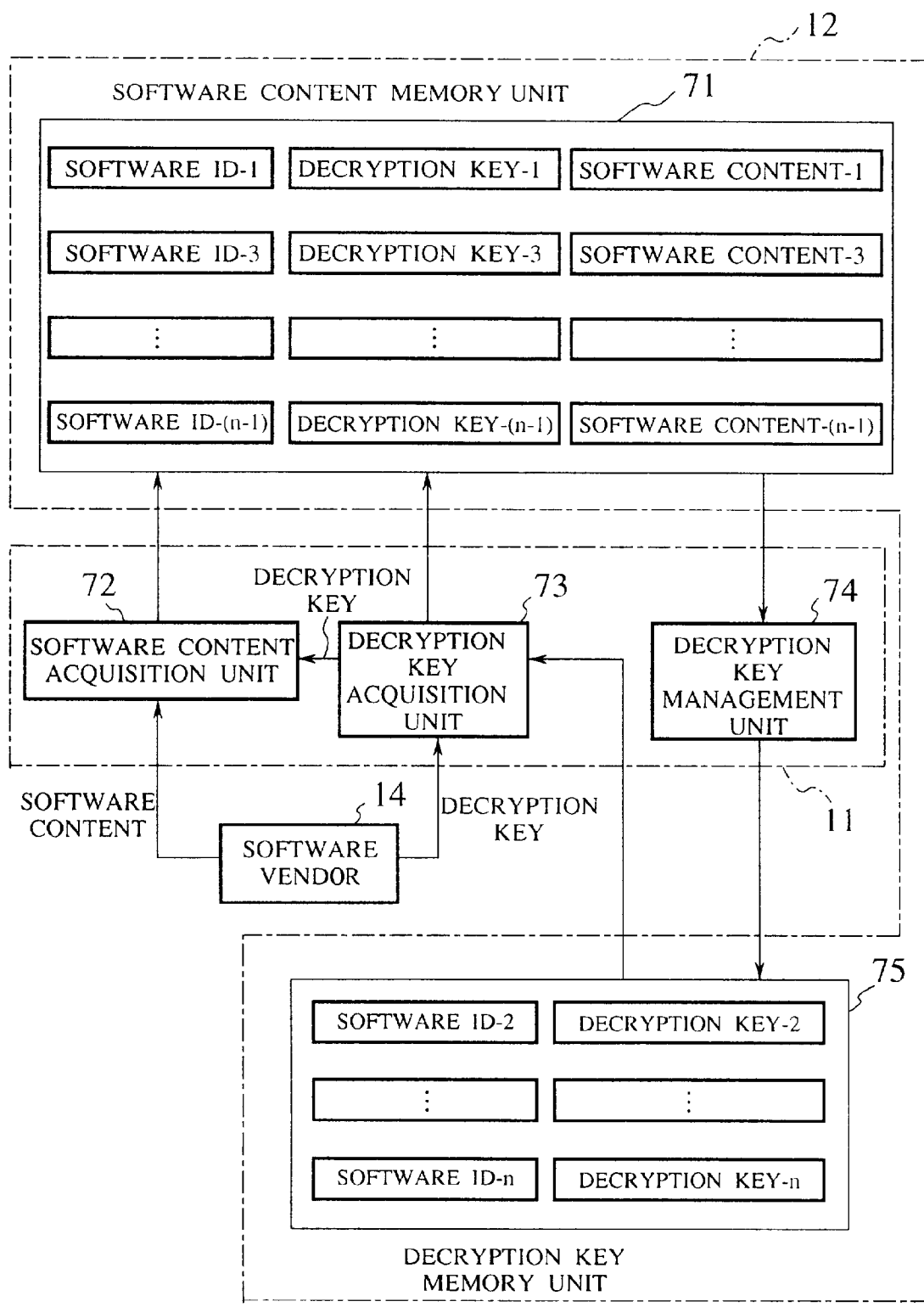
FIG. 8 is a block diagram of another exemplary detailed configuration of the system of FIG. 1 relevant to the decryption key management processing.

FIG. 8 shows another exemplary detailed configuration of the software distribution system of FIG. 1 relevant to the decryption key management processing in this embodiment.

In this configuration of FIG. 8, the hard disk device 12 includes the decryption key memory unit 75 and a software content memory unit 71 which are provided separately, where the decryption key memory unit 75 plays the role of the decryption key memory unit 13 of FIG. 1 while the software content memory unit 71 plays the role of the rest of the hard disk device 12 of FIG. 1.

Also, in this configuration of FIG. 8, the personal computer 11 includes a software content acquisition unit 72, a decryption key acquisition unit 73, and a decryption key management unit 74, which are connected with the software content memory unit 71, while the software content acquisition unit 72 and the decryption key acquisition unit 73 are also connected with each other as well as with the software vender 14, and the decryption key acquisition unit 73 and the decryption key management unit 74 are also connected with the decryption key memory unit 75.

In a case of installing the encrypted software acquired from the software vender 14, either by a communication through the communication network or by a purchase of the recording medium such as CD-ROM, into the personal computer 11 of the user by the software content acquisition unit 72, the decryption key acquisition unit 73 retrieves the decryption key for this software from the decryption key memory unit 75 by using the software ID of this software as a retrieval key. This decryption key acquisition unit 73 corresponds to functions of the decryption key retrieval program, the communication program, and the decryption key storing program of the installer 101 or the decryption key management system 51 described above.

When the corresponding decryption key is found, the retrieved decryption key is used to decrypt the encrypted software, whereas when the corresponding decryption key is not found, the decryption key acquisition unit 73 acquires the corresponding decryption key from the software vender 14 through the communication network, and stores the acquired decryption key and the software ID in correspondence in the software content memory unit 71. Then, the encrypted software content is decrypted by using the obtained decryption key and installed into the software content memory unit 71 by the software content acquisition unit 72. This software content acquisition unit 72 corresponds to functions of the decryption and install program of the installer 101 or the decryption key management system 51 described above.

In a case of deleting a certain software, the software ID, decryption key, and software content of this software are deleted from the software content memory unit 71 while the software ID and decryption key of this software are stored in the decryption key memory unit 75, by the decryption key management unit 74.

In other words, this decryption key management unit 74 is a kind of file management system which reads out the software ID and the decryption key corresponding to the software content to be deleted from the software content memory unit 71, and writes these software ID and decryption key into the decryption key memory unit 75. Consequently, the decryption key memory unit 75 only stores the software IDs and the decryption keys corresponding to the software contents deleted from the software content memory unit 71, so that the software IDs and the decryption keys corresponding to the software contents currently stored in the software content memory unit 71 are not stored in the decryption key memory unit 75. For this reason, the unnecessary information (the software IDs and the decryption keys of the software contents which are currently stored in the software content memory unit 71) is not stored in the decryption key memory unit 75, and therefore an efficiency of the decryption key retrieval from the decryption key memory unit 75 can be improved.

In a state of the software content memory unit 71 and the decryption key memory unit 75 shown in FIG. 8, the software-1 to the software-n have been installed, and out of these, the software contents of the software-2 and the software-n have been deleted, so that the software IDs and the decryption keys of the software-2 and the software-n are also deleted from the software content memory unit 71, while these software IDs and decryption keys of the software-2 and the software-n are stored in the decryption key memory unit 75.

Note that the decryption key memory unit 75 can be provided by a memory medium separated from that of the software content memory unit 71, such that the loss of the software IDs and the decryption keys in the decryption key memory unit 75 may be prevented even when the software contents stored in the software content memory unit 71 are lost because of a damage on a memory medium of the software content memory unit 71 caused by a natural disaster or some other cause.

Note also that the decryption key memory unit 75 can be provided by a detachable memory medium such as a floppy disk, such that this decryption key memory unit 75 can be used for installing softwares into a computer other than the personal computer 11. In this case, the encryption of the decryption key by using the machine ID described above should not be adopted.

Figure 9:
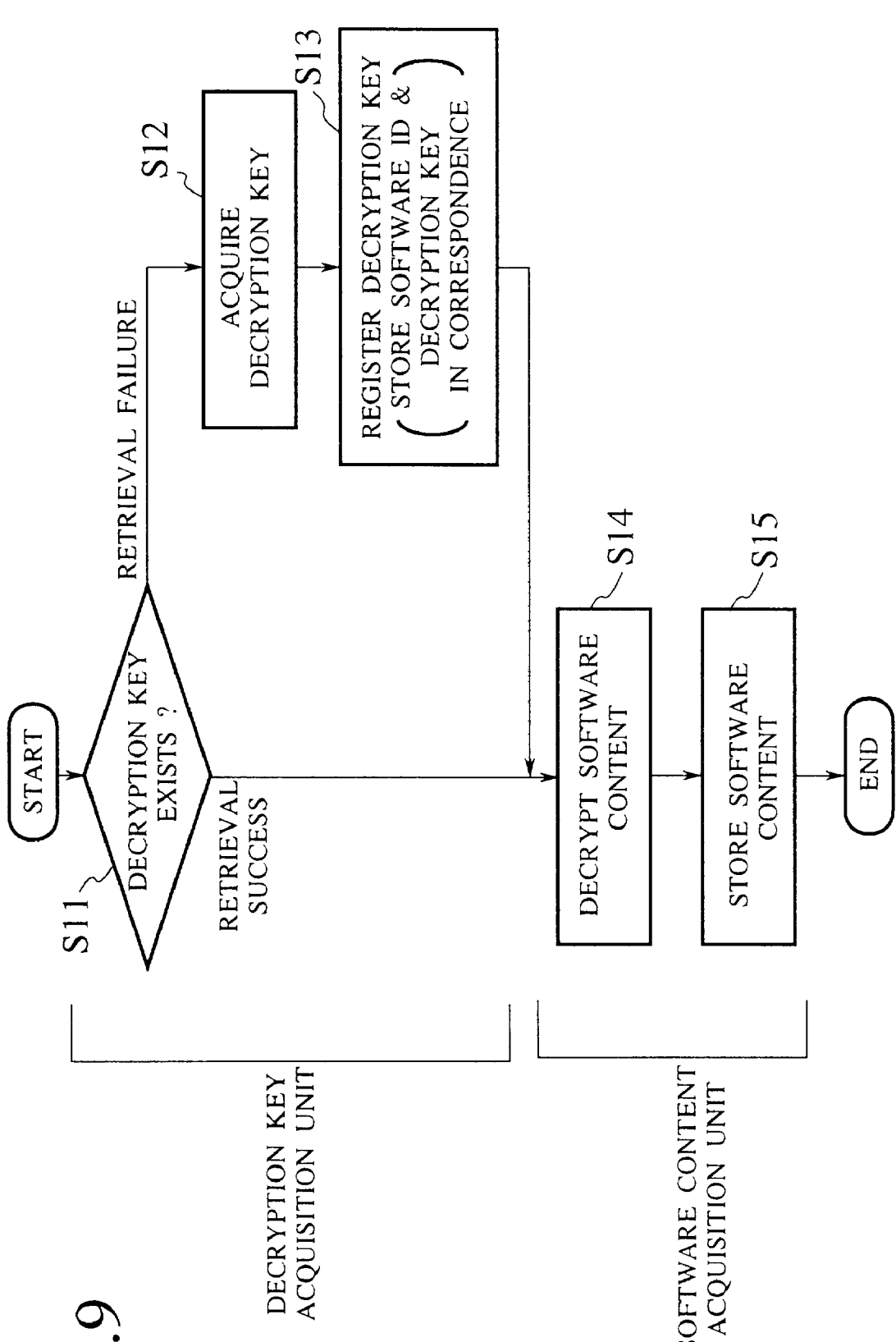
FIG. 9 is a flow chart of a procedure for the encrypted software install processing in the system of FIG. 1.

FIG. 9 shows a procedure for the encrypted software install processing in this embodiment. Here, an exemplary case of installing the encrypted software by using the installer 101 distributed together with the encrypted software content 103 will be described.

When the execution of this processing for a certain software is commanded by the user, the decryption key retrieval program of the installer 101 is activated, and the decryption key of the specified software is searched through the decryption key memory unit 13 (or the decryption key and software content memory unit 61 of FIG. 7 or the decryption key memory unit 75 of FIG. 8), and whether this decryption key exists in the decryption key memory unit 13 or not is checked (step S11).

When the appropriate decryption key does not exist in the decryption key memory unit 13, the communication program of the installer 101 is executed to carry out the decryption key acquisition processing (step S12). Namely, the decryption key request message having a data structure as shown in FIG. 2 is sent from the personal computer 11 of the user to the software vender 14 through the communication network 15, and a prescribed procedure for paying the software usage charge is carried out. After that, the decryption key is sent from the software vender 14 to the personal computer 11 of the user through the communication network 15. Here, when the personal computer 11 of the user is not connected with the communication network 15, the communication program urges the acquisition of the decryption key to the user by means of a screen display of a message indicating a need to acquire the decryption key, a telephone number of the software vender 14, and other necessary information.

The decryption key acquired from the software vender 14 is then stored into the decryption key memory unit 13 (or the decryption key and software content memory unit 61 of FIG. 7 or the decryption key memory unit 75 of FIG. 8) in correspondence with the software ID by the decryption key storing program of the installer 101 (step S13).

Then, the software content 103 to be installed is decrypted by the acquired decryption key (step S14), and installed into the hard disk 12 (or the decryption key and software content memory unit 61 of FIG. 7 or the software content memory unit 71 of FIG. 8) (step S15).

At this point, in a case of using the decryption key management system 51 of FIG. 6 instead of the installer 101, whether the software content to be installed is already acquired or not can be checked, and if not, the user can be urged to acquire the software content to be installed either by a communication through the communication network 15 or by a purchase of the CD-ROM 10, before the steps S14 and S15 are carried out.

On the other hand, when the appropriate decryption key exists in the decryption key memory unit 13, the steps S12 and S13 are skipped, and the decryption of the software content 103 to be installed at the step S14 and the installment of the decrypted software content at the step S15 is carried out by using the decryption key retrieved from the decryption key memory unit 13 (or the decryption key and software content memory unit 61 of FIG. 7 or the decryption key memory unit 75 of FIG. 8).

Again, at this point, in a case of using the decryption key management system 51 of FIG. 6 instead of the installer 101, whether the software content to be installed is already acquired or not can be checked, and if not, the user can be urged to acquire the software content to be installed either by a communication through the communication network 15 or by a purchase of the CD-ROM 10, before the steps S14 and S15 are carried out.

As described, according to the present invention, the decryption key and the software ID of the deleted software are preserved and utilized at a time of re-installing the software content of this deleted software again, so that there is no need for a user to acquire the decryption key more than once. Consequently, it becomes possible for a user to freely delete and re-install the software that was properly obtained once, and therefore it becomes possible to improve the reliability of a software distribution system utilizing the decryption key, which in turn can contribute to a spread of a software distribution system utilizing the decryption key.

It is to be noted that the decryption key is always stored in correspondence with the software ID in the above description, but in a case of using the installer 101 which is distributed together with the software content 103 to be installed, it is also possible to store the decryption key alone as one file, and use the corresponding software ID as a file name of that file.

It is also to be noted that the decryption key is obtained by a communication with a software vender through a communication network in the above description, but it is also possible to obtain the decryption key in a form of a memory medium storing the decryption key therein in exchange for the payment of the software usage charge.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the software 100 having the installer 101 or the decryption key management system 51 to be provided in the personal computer 11 can be conveniently realized in a form of a software package to be installed into a conventional general purpose digital computer.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for managing a decryption key for decrypting an encrypted software to be installed into a computer using a software distribution system in which the decryption key is obtained in exchange for a payment of a software usage charge, and the encrypted software is obtained without the payment of the software usage charge, comprising the steps of:

searching the decryption key in a memory device of said computer, the memory device including a software content memory unit for storing a software content of each currently installed software and a decryption key memory unit for storing each decryption key for decrypting each previously installed and subsequently deleted software;

acquiring the decryption key from a distribution source of the encrypted software in exchange for the payment of the software usage charge when the decryption key is not found in the memory device by the searching step;

decrypting the encrypted software by using the decryption key obtained at the searching step or the acquiring step, installing a decrypted software content of the encrypted software into the software content memory unit of the memory device, and storing the decryption key into the software content memory unit of the memory device; and deleting the encrypted software by deleting the decrypted software content installed at the decrypting step and the decryption key stored at the decrypting step from the software content memory unit of the memory device, and storing the decryption key into the decryption key memory unit of the memory device, such that the decryption key stored in the decryption key memory unit of the memory device is utilizable in decrypting the encrypted software at a time of re-installing the encrypted software without requiring another payment of the software usage charge.

2. The method of claim 1, wherein the storing step stores the decryption key separately from the decrypted software content in the memory device.

3. The method of claim 1, wherein the storing step stores the decryption key in a memory medium separately provided from a memory medium for installing the decrypted software content in the memory device.

4. The method of claim 1, further comprising the step of:
deleting a previously installed software by deleting a decrypted software content of the previously installed software from the memory device, while maintaining a decryption key for decrypting the previously installed software in the memory device.

5. A method for distributing a software from a distribution source to users using a software distribution system in which the decryption key is obtained in exchange for a payment of a software usage charge, and the encrypted software is obtained without the payment of the software usage charge, comprising the steps of:

encrypting software to be distributed to users at a distribution source side, and distributing encrypted software to users;

searching a decryption key for decrypting the encrypted software in a memory device of a user's computer at an individual user side, the memory device including a software content memory unit for storing a software content of each currently installed software and a decryption key memory unit for storing each decryption key for decrypting each previously installed and subsequently deleted software;

providing the decryption key corresponding to the encrypted software from the distribution source side to the individual user side in exchange for the payment of the software usage charge when the decryption key is not found in the memory device by the searching step;

decrypting the encrypted software distributed at the encrypting step by using the decryption key obtained at the searching step or the providing step, installing a decrypted software content of the encrypted software into the software content memory unit of the memory device, and storing the decryption key into the software content memory unit of the memory device at the individual user side; and deleting the encrypted software by deleting the decrypted software content installed at the decrypting step and the decryption key stored at the decrypting step from the software content memory unit of the memory device, and storing the decryption key into the decryption key memory unit of the memory device at the individual user side, such that the decryption key stored in the decryption key memory unit of the memory device is utilizable in decrypting the encrypted software at a time of re-installing the encrypted software without requiring another payment of the software usage charge.

6. The method of claim 5, wherein the providing step includes the steps of:

requesting the decryption key from the individual user side to the distribution source side;

carrying out at the distribution source side a processing for charging a software usage charge to a user who requested the decryption key at the requesting step; and sending the decryption key from the distribution source side to the individual user side of said user in exchange for a payment of the software usage charge by said user.

7. The method of claim 1, wherein the storing step stores the decryption key in correspondence to a software ID of the encrypted software, and the searching step searches the decryption key by using the software ID acquired from the encrypted software.

8. The method of claim 1, wherein the acquiring step acquires the decryption key by a communication with the distribution source through a communication network.

9. The method of claim 1, further comprising the step of:
acquiring the encrypted software by a communication between said computer and the distribution source through a communication network.

10. The method of claim 1, further comprising the step of:
acquiring the encrypted software by obtaining a memory medium which stores an encrypted software content and which is distributed by the distribution source, and setting the memory medium in said computer.

11. The method of claim 1, wherein the searching step, the acquiring step, the decrypting step, and the storing step are executed by non-encrypted installer programs accompanying the encrypted software.

12. The method of claim 1, wherein the searching step, the acquiring step, the decrypting step, and the storing step are executed by installer programs implemented in said computer in advance.

13. A computer for managing a decryption key for decrypting an encrypted software to be installed into said computer using a software distribution system in which the decryption key is obtained in exchange for a payment of a software usage charge, and the encrypted software is obtained without the payment of the software usage charge, comprising:

a memory device including a software content memory unit for storing a software content of each currently installed software, and a decryption key memory unit for storing each decryption key for decrypting each previously installed and subsequently deleted software;

a decryption key retrieval unit for retrieving the decryption key for decrypting the encrypted software from the memory device;

a decryption key acquisition unit for acquiring the decryption key corresponding to the encrypted software from a distribution source of the encrypted software in exchange for the payment of the software usage charge when the decryption key is not found in the memory device by the decryption key retrieval unit;

a decryption and install unit for decrypting the encrypted software by using the decryption key obtained by the decryption key retrieval unit or the decryption key acquisition unit, installing a decrypted software content of the encrypted software into the software content memory unit of the memory device, and storing the decryption key into the software content memory unit of the memory device; and a decryption key storing unit for deleting the encrypted software by deleting the decrypted software content installed at the decrypting step and the decryption key stored at the decrypting step from the software content memory unit of the memory device, and storing the decryption key into the decryption key memory unit of the memory device, such that the decryption key stored in the decryption key memory unit of the memory device is utilizable in decrypting the encrypted software at a time of re-installing the encrypted software without requiring another payment of the software usage charge.

14. The computer of claim 13, wherein the decryption key storing means stores the decryption key separately from the decrypted software content in the memory device.

15. The computer of claim 13, wherein the decryption key storing means stores the decryption key in a memory medium separately provided from a memory medium for installing the decrypted software content in the memory device.

16. The computer of claim 13, further comprising:

means for deleting a previously installed software by deleting a decrypted software content of the previously installed software from the memory device, while maintaining a decryption key for decrypting the previously installed software in the memory device.

17. A system for distributing a software from a distribution source to users using a software distribution system in which the decryption key is obtained in exchange for a payment of a software usage charge, and the encrypted software is obtained without the payment of the software usage charge, comprising:

a distribution source computer center for encrypting software to be distributed to users, and distributing encrypted software to users; and a plurality of user's computers connected with the distribution source computer center via a communication network, each user's computer having:

a memory device including a software content memory unit for storing a software content of each currently installed software, and a decryption key memory unit for storing each decryption key for decrypting each previously installed and subsequently deleted software;

a decryption key retrieval unit for retrieving the decryption key for decrypting the encrypted software from the memory device;

a decryption key acquisition unit for acquiring the decryption key corresponding to the encrypted software from the distribution source computer center in exchange for the payment of the software usage charge when the decryption key is not found in the memory device by the decryption key retrieval unit;

a decryption and install unit for decrypting the encrypted software distributed by the distribution source computer center by using the decryption key obtained by the decryption key retrieval unit or the decryption key acquisition unit, installing a decrypted software content of the encrypted software into the software content memory unit of the memory device, and storing the decryption key into the software content memory unit of the memory device; and a decryption key storing unit for deleting the encrypted software by deleting the decrypted software content installed at the decrypting step and the decryption key stored at the decrypting step from the software content memory unit of the memory device, and storing the decryption key into the decryption key memory unit of the memory device, such that the decryption key stored in the decryption key memory unit of the memory device is utilizable in decrypting the encrypted software at a time of re-installing the encrypted software without requiring another payment of the software usage charge.

18. The system of claim 17, wherein the distribution source computer center carries out a processing for charging a software usage charge to a user who requested the decryption key, and sends the decryption key to the user's computer of said user in exchange for a payment of the software usage charge by said user.

19. The computer of claim 13, wherein the decryption key storing means stores the decryption key in correspondence to a software ID of the encrypted software, and the decryption key retrieval means retrieves the decryption key by using the software ID acquired from the encrypted software.

20. The computer of claim 13, wherein the decryption key acquisition means acquires the decryption key by a communication with the distribution source through a communication network.

21. The computer of claim 13, further comprising:

means for acquiring the encrypted software by a communication between said computer and the distribution source through a communication network.

22. The computer of claim 13, further comprising:

means for setting the encrypted software in said computer, the encrypted software being provided as a memory medium which stores an encrypted software content and which is distributed by the distribution source.

23. The computer of claim 13, wherein the encrypted software is accompanied by non-encrypted installer programs for controlling operations of the decryption key retrieval means, the decryption key acquisition means, the decryption and install means, and the decryption key storing means.

24. The computer of claim 13, further comprising:

installer programs implemented in said computer in advance for controlling operations of the decryption key retrieval means, the decryption key acquisition means, the decryption and install means, and the decryption key storing means.

25. A computer usable medium having computer readable program code stored therein for causing a computer to function as a system for managing a decryption key for decrypting an encrypted software to be installed into said computer using a software distribution system in which the decryption key is obtained in exchange for a payment of a software usage charge, and the encrypted software is obtained without the payment of the software usage charge, the computer readable program code comprising:

first computer readable program code for causing said computer to search the decryption key in a memory device of said computer, the memory device including a software content memory unit for storing a software content of each currently installed software and a decryption key memory unit for storing each decryption key for decrypting each previously installed and subsequently deleted software;

second computer readable program code for causing said computer to acquire the decryption key from a distribution source of the encrypted software in exchange for the payment of the software usage charge when the decryption key is not found in the memory device by the first computer readable program code;

third computer readable program code for causing said computer to decrypt the encrypted software by using the decryption key obtained by the first computer readable program code or the second computer readable program code, install a decrypted software content of the encrypted software into the software content memory unit of the memory device, and storing the decryption key into the software content memory unit of the memory device; and fourth computer readable program for causing said computer to delete the encrypted software by deleting the decrypted software content installed by the third computer readable program code and the decryption key stored by the third computer readable program code from the software content memory unit of the memory device, and store the decryption key into the decryption key memory unit of the memory device, such that the decryption key stored in the decryption key memory unit of the memory device is utilizable in decrypting the encrypted software at a time of re-installing the encrypted software without requiring another payment of the software usage charge.

26. The article of claim 25, wherein the fourth computer readable program code means causes said computer to store the decryption key separately from the decrypted software content in the memory device.

27. The article of claim 25, wherein the fourth computer readable program code means causes said computer to store the decryption key in a memory medium separately provided from a memory medium for installing the decrypted software content in the memory device.

28. The article of claim 25, further comprising:

fifth computer readable program code means for causing said computer to delete a previously installed software by deleting a decrypted software content of the previously installed software from the memory device, while maintaining a decryption key for decrypting the previously installed software in the memory device.

29. The article of claim 25, wherein the computer usable medium contains the encrypted software and the computer readable program code means which are not encrypted, and the computer usable medium is distributed by the distribution source and used by being set in said computer.

30. The article of claim 25, wherein the computer usable medium is implemented in said computer in advance.

31. The article of claim 25, wherein the fourth computer readable program code means causes said computer to store the decryption key in correspondence to a software ID of the encrypted software, and the first computer readable program code means causes said computer to search the decryption key by using the software ID acquired from the encrypted software.

32. The article of claim 25, wherein the second computer readable program code means causes said computer to acquire the decryption key by a communication with the distribution source through a communication network.

33. The article of claim 25, further comprising:

eighth computer readable program code means for causing said computer to acquire the encrypted software by a communication between said computer and the distribution source through a communication network.

34. The article of claim 25, further comprising:

ninth computer readable program code means for causing said computer to set the encrypted software in said computer, the encrypted software being provided as a memory medium which stores an encrypted software content and which is distributed by the distribution source.

\* \* \* \* \*